July 28, 1936.  N. DE LONG  2,048,688
GEAR
Filed July 5, 1932
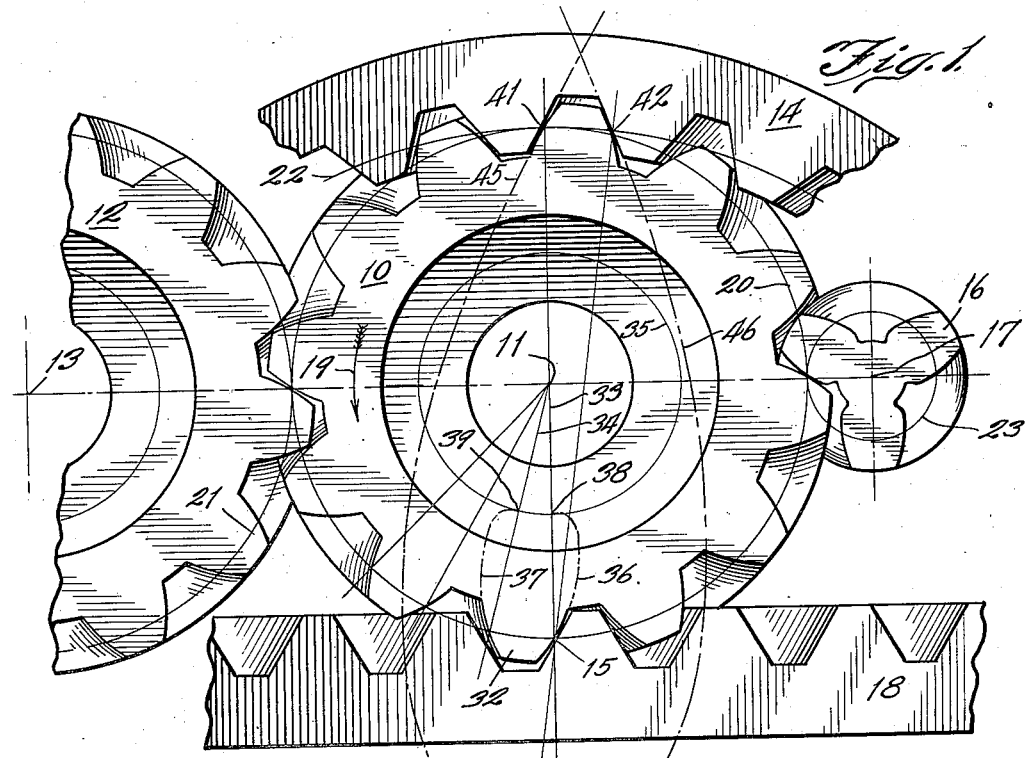
Inventor:
Nelson DeLong
By Casper L. Redfield
Atty.

Patented July 28, 1936

2,048,688

UNITED STATES PATENT OFFICE 2,048,688

GEAR

Nelson De Long, Chicago, Ill., assignor to Arthur Dean, trustee, Chicago, Ill.

Application July 5, 1932, Serial No. 620,789

4 Claims. (Cl. 74—416)

My invention relates to toothed gears, and has for its object the production of a form of tooth which will have great efficiency and will be noiseless, and one which is easy of production and will be stronger than other teeth of the same nominal dimensions.

In the making of ordinary gears it has been the practice heretofore to adopt for the tooth flank a curve which will give the best possible results in plain spur gearing. I have departed from that practice and have adopted a curve which is unsatisfactory for plain spur gears, but which, when combined with the helix of helical gears, gives perfect and continuous rolling contact at the pitch lines.

The curve I use for the flanks of the gear teeth is known as the equiangular or logarithmic spiral. This is a curve in which the tangent to any point on the curve makes the same angle with the radius vector of that point as does the tangent of any other point to its radius vector. I may use a curve which cuts radii at any angle, but for illustration I use a curve which cuts radii at thirty degrees, which is a convenient angle and one well adapted for gear teeth of all sizes.

Two gears having teeth with flanks formed by the same spiral will have those flanks in point contact only in the straight line between gear centers. To maintain the points of contact uniformly at the pitch line, and on the line between gear centers, I make use of the well known helical type of gear.

In the accompanying drawing

Fig. 1 represents a gear in mesh with four other gears, together with construction lines showing how the curves forming the flanks of the teeth are found;

Figs. 2 and 3 are diagrams showing how different points in a curve of the same angle meet on the straight line between centers of gears; and Fig. 4 is a fragment of two double helical gears, commonly known as herringbone gears.

The gear 10, having its center at 11, is in mesh with another gear 12 of the same size and with a center at 13. The gear 10 is also in mesh with an internal gear 14 of twice the diameter of gear 10 and with its center at 15. The gear 10 also engages a three-toothed gear 16 having a center at 17, and a rack 18. In this drawing, the gear 10 may be considered as a driver moving in the direction of the arrow 19.

The pitch line of the gear 10 is the line 20, the pitch line of the gear 12 is at 21, that of gear 14 is at 22, and that of gear 16 as it 23.

The curve which forms the flank of a tooth based upon a spiral of any particular angle, is a short segment of that spiral, and it may be a segment taken at any part of the spiral. When so made, it will work perfectly with another tooth having its flank from the same or any other segment of the spiral.

In Fig. 2, let A—B be a line passing thru the centers of two gears in mesh with each other, and the point P be the point where the pitch lines touch each other. The centers of the gears may be at any convenient places on the line A—B, but preferably will be on extensions thereof. The line C—D passes thru the point P at an angle to the line A—B which is the angle of the adopted spiral. In the present case this is thirty degrees. The curve 24 having its center at 25, and the curve 26 having its center at 27, are identical curves—being thirty degree logarithmic spirals. The line C—D is tangent to both of them at the point P.

If the curves 24 and 26 are turned about the points 25 and 27 as pivots, and are kept in contact with each other while being turned, there will be perfect rolling contact at the meeting point, and that meeting point will travel along the line A—B toward either 25 or 27 according to the direction of turn. And the line C—D tangent to the two curves at their point of contact will remain uniformly at the same angle, which is represented as thirty degrees in the drawing.

In Fig. 3, we have lines A—B and C—D cutting each other at the point P and at an inclination to each other of thirty degrees. The curve 28, having its origin (center) at 29, is identical with the curve 30 having its origin at 31. They are both tangent to the line C—D at the point P. As far as the drawing goes, that part of the curve 30 which lies between 31 and P is simply a duplicate of the first part of the curve 28.

Referring to Fig. 1, and taking a tooth 32 of gear 10 where it engages the rack 18, radial lines 33 and 34 are drawn to points on the pitch line 20 which will represent the intended thickness of the tooth at the pitch line. With 11 as a center, there is drawn a circle 35 which is less than the diameter of the circle 20. The distance between the circle 35 and the circle 20 on any radius from the center 11, is the radius vector of the curve used in forming the flanks of the gear teeth shown. The dotted lines 36 and 37, having their origins at 38 and 39, are those parts of the logarithmic spiral inside of the flanks of the teeth.

The center of the internal gear 14 is at 15. With 15 as a center, draw the arc 40 which is simply a part of a circle having a purpose similar to the purpose of the circle 35. Lay off on the pitch circle 22 the points 41 and 42 representing the space between two teeth on the gear 14. From 41 and 42 draw lines which pass thru the center 15 and cut arc 40 at points 43 and 44. The point 43 is the center or origin for the curve 45, and the point 44 is the center for curve 46.

Comparing Fig. 1 with Fig. 3, the distance on line A—B (Fig. 3) between the point 29 and point P corresponds to the distance between 42 and 43 of Fig. 1. And the distance between 31 and P of Fig. 3 corresponds to the distance between 36 and 15 on the radius 33. As it is shown in Fig. 3 that curves 28 and 30 are tangent in the same way at point P in line C—D, it will be evident that the curve 36 of Fig. 1 has the same tangential contact at point 15 as would occur if the tooth curve were drawn from the center 11 instead of from the center 36.

The curves 45 and 46 are the same curves before mentioned—thirty degree logarithmic spirals—but the part of the curve for tooth flank is further out from the center. In the case of gear 16, the same principles are involved, but the part of the curve used is the part removed only a short distance from the center.

A rack is a gear of infinite diameter. As a consequence, the flanks of the rack teeth may be straight lines inclined to the face of the rack at the same angle as that adopted for the spiral. In the present case, this is thirty degrees.

When gears 10 and 12 are in the position shown in Fig. 1, there is an ideal drive with rolling contact at the pitch line. If these gears are plain spur gears, there will continue, for a time, to be rolling contact on the line 11—13 joining the centers of these gears during motion of said gears, but the point of contact will move along line 11—13 from the driving toward the driven gear.

To maintain the point of contact between driving and driven gears uniformly at the pitch line, I apply this spiral curve to helical gears, or double helical gears known as herringbone gears. When two helical gears operate together, the point of contact on the pitch line, and on a line joining the centers of the shafts, travels along the helix of the gear tooth. By combining the rolling contact of tooth flanks formed on logarithmic spirals, with the helix of helical teeth, I am enabled to keep the contact point always on the pitch line.

It is to be noticed that the logarithmic spiral is an open curve, that is, one which does not repeat itself no matter how far it is extended. It is a principle of mathematics that a non-repeating curve cannot be used for the transmission of continuous rotation, and scientific authority has specifically stated that the logarithmic spiral cannot be used for that purpose. But by combining an enclosed curve with another curve, as the helix, I am enabled to produce continuous rotation and also to substitute rolling contact for sliding contact in gearing.

Fig. 4 represents gears 10 and 12 as herringbone gears. In this construction, the contact points on any double pair of teeth begin at the center line 47 and move outward in each direction to the ends 48. This action eliminates all sliding friction of both approach and recession, and leaves only rolling friction. The helix used may be of any convenient degree.

From the foregoing description it will be evident that the flanks of the teeth have a shape of face which is a compound curve. This compound curved face is a spiral in one direction and a helix in a direction perpendicular thereto, but in a bevel gear, the second curve would not necessarily be a helix. One of these curves gives a constant contact at the pitch line in a direction perpendicular to the axes of the gear shafts, and the other gives a rolling contact in a direction parallel with said axes.

The examples of logarithmic spiral given in Figs. 1, 2 and 3 show that the rate of curvature is greater near the origin than it is further out. Figs. 2 and 3 show that the rolling action of one curve on another of the same angle is the same for all parts of the curve, and consequently for all degrees of curvature. From this fact comes the ability of the curve to maintain contact at the pitch line.

Gear teeth of this form may be of a length similar to those of other forms, but are preferably somewhat shorter because the working face is limited to a narrow band at the pitch line. Because the rolling action of one contact face on another, as illustrated in Fig. 2, is independent of the distance between the centers of the curves, longer teeth permit some variation in distance between centers of gears without impairing the efficiency of operation.

But long teeth have a tendency for their tips to interfere during operation. This tendency is reduced by using for gear flanks those parts of the spiral which are near to the origin rather than those parts which are far out. This is one reason for having the curves begin in a circle 35 rather than at or near the center 11. Another reason is that it makes possible the use of the same cutter for all sizes of gears having the same pitch.

What I claim is:

1. A gear having the faces of its teeth in the form of a compond curve, said compound curve being a logarithmic spiral in one direction and a curve in a direction perpendicular to the spiral.

2. A helical gear having each flank of its teeth on a curve which consists of a short segment of a logarithmic spiral.

3. A gear having each flank of its teeth in the form of a short segment of a logarithmic spiral, the radius vector of the spiral at the pitch line of the gear being less than the radius of the gear.

4. A helical gear having each flank of its teeth on a curve which consists of a segment of a logarithmic spiral, the center of which spiral is on a gear radius to the point where the curve cuts the pitch line of the gear.

NELSON DE LONG.